(12) United States Patent
Durham et al.

(10) Patent No.: US 9,828,834 B2
(45) Date of Patent: Nov. 28, 2017

(54) WATER REMOVAL FROM ANTI-AGGLOMERATE LDHIS

(75) Inventors: Danny Durham, Houston, TX (US); James Russum, Houston, TX (US); Nathan Davis, Houston, TX (US); Curtis Conkle, Houston, TX (US)

(73) Assignee: Multi-Chem Group, LLC, San Angelo, TX (US)

( * ) Notice: Subject to any disclaimer, the term of this patent is extended or adjusted under 35 U.S.C. 154(b) by 1457 days.

(21) Appl. No.: 13/238,757

(22) Filed: Sep. 21, 2011

(65) Prior Publication Data

US 2012/0103422 A1 May 3, 2012

Related U.S. Application Data

(60) Provisional application No. 61/385,033, filed on Sep. 21, 2010.

(51) Int. Cl.
| | | |
|---|---|---|
| *C09K 8/54* | (2006.01) |
| *E21B 41/02* | (2006.01) |
| *C23F 11/10* | (2006.01) |
| *C23F 11/14* | (2006.01) |
| *F16L 58/00* | (2006.01) |

(52) U.S. Cl.
CPC ......... *E21B 41/02* (2013.01); *C09K 8/54* (2013.01); *C23F 11/10* (2013.01); *C23F 11/141* (2013.01); *F16L 58/00* (2013.01); *C09K 2208/22* (2013.01); *Y10T 137/0318* (2015.04)

(58) Field of Classification Search
CPC .. C09K 8/38; C09K 2208/12; C09K 2208/32; C09K 8/22; C09K 8/52; C09K 8/68; C09K 8/54; C09K 8/94; C09K 8/12; C09K 8/532; C09K 8/703; C09K 2208/20; C09K 8/64; C09K 8/685; C09K 2208/22; C09K 2208/26; C09K 2208/30; C09K 2208/34; C09K 3/18; C09K 3/185; C09K 15/16; C09K 8/536; C09K 8/805; C09K 15/34; C09K 2208/10; C09K 2208/18; C09K 2208/24; Y10S 585/95
See application file for complete search history.

(56) References Cited

U.S. PATENT DOCUMENTS

| | | |
|---|---|---|
| 6,444,852 B1 | 9/2002 | Milburn et al. |
| 2005/0137432 A1 | 6/2005 | Matthews |
| 2006/0120051 A1* | 6/2006 | Macris et al. ............... 361/704 |
| 2006/0135372 A1* | 6/2006 | Hossaini et al. ............ 507/200 |
| 2008/0041228 A1* | 2/2008 | Seibert .......................... 95/166 |
| 2009/0173663 A1* | 7/2009 | Leinweber et al. ........... 208/47 |

FOREIGN PATENT DOCUMENTS

| | | | |
|---|---|---|---|
| WO | WO 03/006583 | * | 1/2003 |
| WO | WO03/006583 | * | 1/2003 |
| WO | WO 2005/042675 | * | 5/2005 |
| WO | WO2005/042675 | * | 5/2005 |
| WO | WO 2009/042319 | * | 4/2009 |
| WO | WO2009/042319 | * | 4/2009 |

OTHER PUBLICATIONS

D.D. Perrin, W.L.F. Armarego, D.R. Perrin, Purification of laboratory chemicals, Pergaman Press, 1980 (2nd Ed.) pp. 20-25).*
http://dictionary.reference.com/browse/dehydrate?s=t downloaded on Jul. 9, 2014.*
Office Action issued in related United Kingdom Application No. GB1603939.8 dated Apr. 18, 2016 (4 pages).

* cited by examiner

*Primary Examiner* — Kumar R Bhushan
(74) *Attorney, Agent, or Firm* — Tenley Krueger; Baker Botts L.L.P.

(57) ABSTRACT

A method of controlling corrosion in a subsea pipeline is disclosed which includes supplying a low dose inhibitor stream (LDHI) comprised of a quaternary amine and drying with a desiccant.

10 Claims, 7 Drawing Sheets

WATER REMOVAL FROM ANTI-AGGLOMERATE LDHIS

FIELD OF THE INVENTION

The invention relates generally to the field of water removal from anti-agglomerates. More specifically the invention relates to the use of certain desiccants to remove water from low dosage hydrate inhibitors ("LDHIs") in petroleum and natural gas production systems.

BACKGROUND ART

Gas hydrates are solids that may form during hydrocarbon production, in particular in pipelines and other equipment, that may impede or completely block flow of hydrocarbons. These blockages not only decrease or stop production, potentially costing millions of dollars in lost production, but are also very difficult and dangerous to mediate. Unless properly handled, gas hydrates may explode, rupturing pipelines, damaging equipment, endangering workers and putting at risk the ocean environment.

Gas hydrates may form when water molecules become bonded together after coming into contact with certain "guest" gas molecules. Hydrogen bonding causes the water molecules to form a regular lattice structure that is stabilized by the guest gas molecules. The resulting crystalline structure precipitates as a solid gas hydrate. Guest molecules can include any number of molecules, including carbon dioxide, methane, butane, propane, hydrogen, helium, freons, halogens, and noble gases.

Various types of inhibitors may be used to control formation or the effect of gas hydrates. One example is anti-agglomerate gas inhibitors, which are typically more cost effective than certain other inhibitors, as anti-agglomerate gas inhibitors may be used in much lower concentrations and are typically useful in environments with greater subcooling than would be appropriate for other inhibitors. However, many of the traditional anti-agglomerate LDHI's contain residual halides, such as HCl, HBr, and the like, and residual organic halides. Residual halides have been known to cause corrosion and stress corrosion cracking ("SCC") in metal piping and production equipment. One example of a commonly used anti-agglomerate LDHI is a quaternary anti-agglomerate containing residual organic halides, such as Kelland, 2006. As an example, Milburn et al. U.S. Pat. No. 6,444,852 entitled "Amines Useful in Inhibiting Gas Hydrate Formation," which is hereby incorporated by reference in its entirety, describes anti-agglomerate ether-containing amine compounds that are quaternized with a halide ("quaternary amines").

It is has been determined that LDHIs have contributed to and/or responsible for general corrosion and, in particular, pitting corrosion in certain subsea applications. This corrosion seems particularly acute in deep sea applications. It is believed residual halides present in LDHIs, in particular quaternary amine-containing LDHIs are responsible for these types of corrosion. While traditional acid corrosion inhibitors have been utilized in an effort to control this corrosion, the traditional acid corrosion inhibitors have not been particularly effective.

What is needed is a method of controlling the general corrosion and pitting corrosion in metals in undersea oil and gas production applications that are exposed to halide containing LDHIs, in particular, quaternary amines.

SUMMARY

The compounds and methods described herein relate generally to the field of gas and oil production. Other uses may also be made of same. In particular, compositions and methods for controlling general corrosion and pitting due to the use of halide-containing LDHIs are described.

DETAILED DESCRIPTION

While not bound by theory, it is believed that over time, water can contaminate halide-containing quaternary amines in use in the field as low dosage hydrate inhibitors. While quaternary amines as manufactured do not normally contain significant amounts of water, water may accumulate in the LDHI through transfers in piping that may contain trace amounts of water or through exposure to the atmosphere. The accumulation of water in the LDHI can, when residual halides are present, lower the pH of the formula over time by creating corrosive acids. Such corrosive acids can increase corrosion rates of metals and metal alloys, including stainless steel, and create failures due to general and, in particular, pitting corrosion. Chloride stress cracking may also become more of an issue.

It has been previously believed that particular types of stainless steel would not suffer the pitting and general corrosion observed in these undersea oil and gas applications. As is known by those of ordinary skill in the art, stainless steel exposed to oxygen typically passivates to form a thin oxidized layer that prevents or substantially reduces corrosion. However, again without wishing to be bound by theory, it is believed that in deep sea applications, stainless steel is not exposed to sufficient oxygen to fully passivate. This unpassivated or partially passivated stainless steel may be then subject to general corrosion and pitting corrosion by acids formed by halides and small amounts of water in the quaternary amines.

Figure 1:
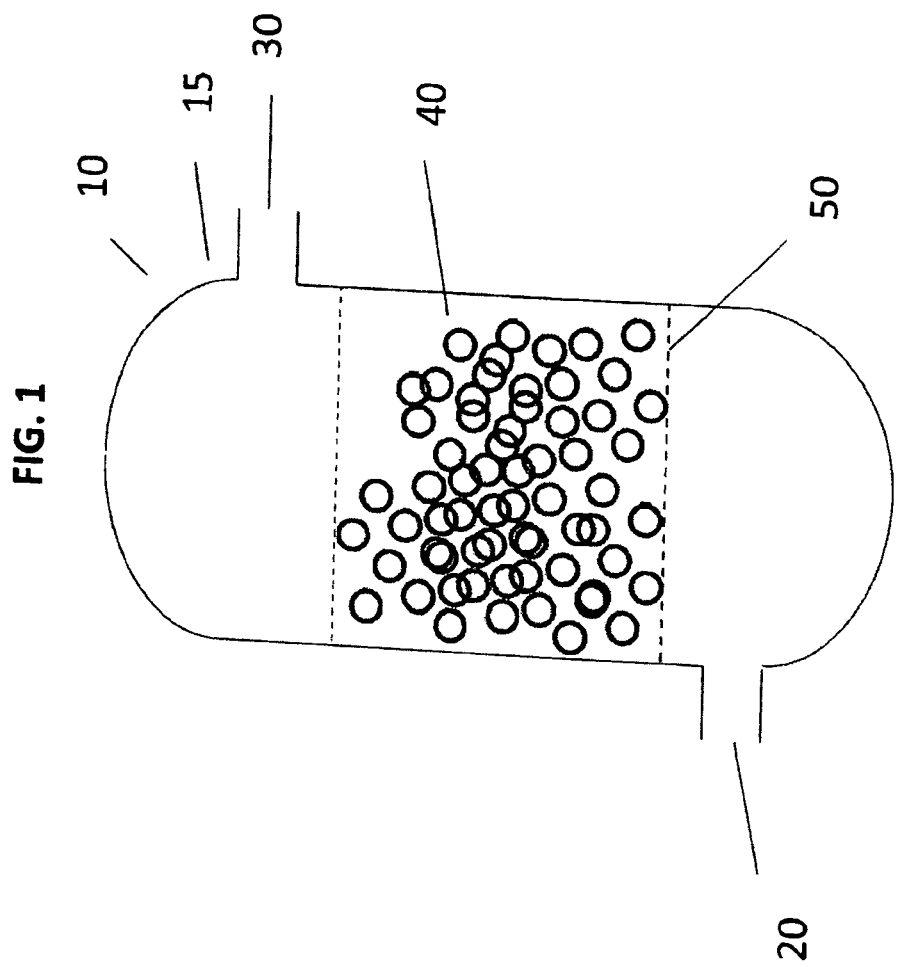
FIG. 1 is a schematic of a dryer system consistent with the present disclosure.

In one embodiment of the present invention, water is removed from the use of an external desiccant, such as through the use of a dryer. In a particular embodiment of the present invention, as depicted in FIG. 1, dryer system 10 is used to remove water from the LDHI. Dryer vessel 15 includes dryer inlet 20 and dryer outlet 30. External desiccant 40 rests within dryer vessel 15 on mesh 50. The LDHI enters dryer inlet 20, passes through mesh 50 and then through external desiccant 40, which removes part or substantially all of the water present in the LDHI. The LDHI then exits dryer vessel 15 through dryer outlet 30.

External desiccant 40 may be any desiccant that is compatible with the LDHI and capable of removing water from the LDHI. Examples include, but are not limited to, certain clays, silica gel, molecular sieves, calcium oxide and calcium sulfate.

Clay is a naturally occurring porous adsorbent. The mined clay may be activated for use as a desiccant by drying at an elevated temperature with dry air or an inert gas such as nitrogen. Typically, clays may be regenerated for repeated uses. Clays are typically inexpensive and can be effective within normal temperature and relative humidity ranges. One example of a clay desiccant material is Montmorillonite clay, composed primarily of magnesium aluminum silicate. After mining, the Montmorillonite clay is purified, reduced to granules and subjected to a controlled dehydration process to increase its sorbent porosity.

Silica gel is a partially dehydrated form of polymeric colloidal silicic acid. Silica gel has an amorphous microporous structure with a distribution of pore opening sizes of roughly 3-60 angstroms. The interconnected pores attract and hold water by adsorption and capillary condensation. Some silica gels adsorb up to 40% of their weight in water. Silica gel is typically non-corrosive and nontoxic.

Molecular sieves, such as synthetic zeolite, adsorb moisture typically more strongly than silica gel and clay. Where a very low relative humidity is required, molecular sieves are often the most economic desiccant because of their high adsorption capacity at low relative humidity. Also, molecular sieves typically will not desorb as readily as silica gel and clay at higher temperatures. Molecular sieves have a network of crystalline pores and empty adsorption cavities.

Calcium oxide (CaO) is calcinated or recalcinated lime. Calcium oxide will often adsorb a much greater amount of water at low relative humidity than other materials an can be effective in retaining moisture at high temperatures.

Calcium sulfate ($CaSO_4$) is created by the controlled dehydration of gypsum, It is chemically stable, non-disintegrating, nontoxic, non-corrosive, and will generally not release adsorbed water when exposed to higher temperatures. Calcium sulfate typically has lower adsorptive capacity compared to other external desiccants and has limited regeneration ability.

Other external desiccants include: activated charcoal, calcium chloride, metal salts, activated alumina, aerogel, benzophenone, calcium hydride, cobalt(II) chloride, copper (II) sulfate, lithium chloride, lithium hydride, lithium bromide, magnesium, magnesium sulfate, magnesium perchlorate, NaK (a sodium-potassium alloy), phosphorus pentoxide, potassium, potassium carbonate, sodium, sodium chlorate, sodium chloride, sodium hydroxide, sodium sulfate, sodium-benzophenone, sucrose, sulfuric acid.

Dryer system 10 may be placed as needed above prior to transferring the LDHI downhole. In certain embodiments of the present disclosure, dryer system is placed to minimize the amount of additional moisture that could be absorbed by the LDHI, such as just prior to injection downhole.

Figure 2:
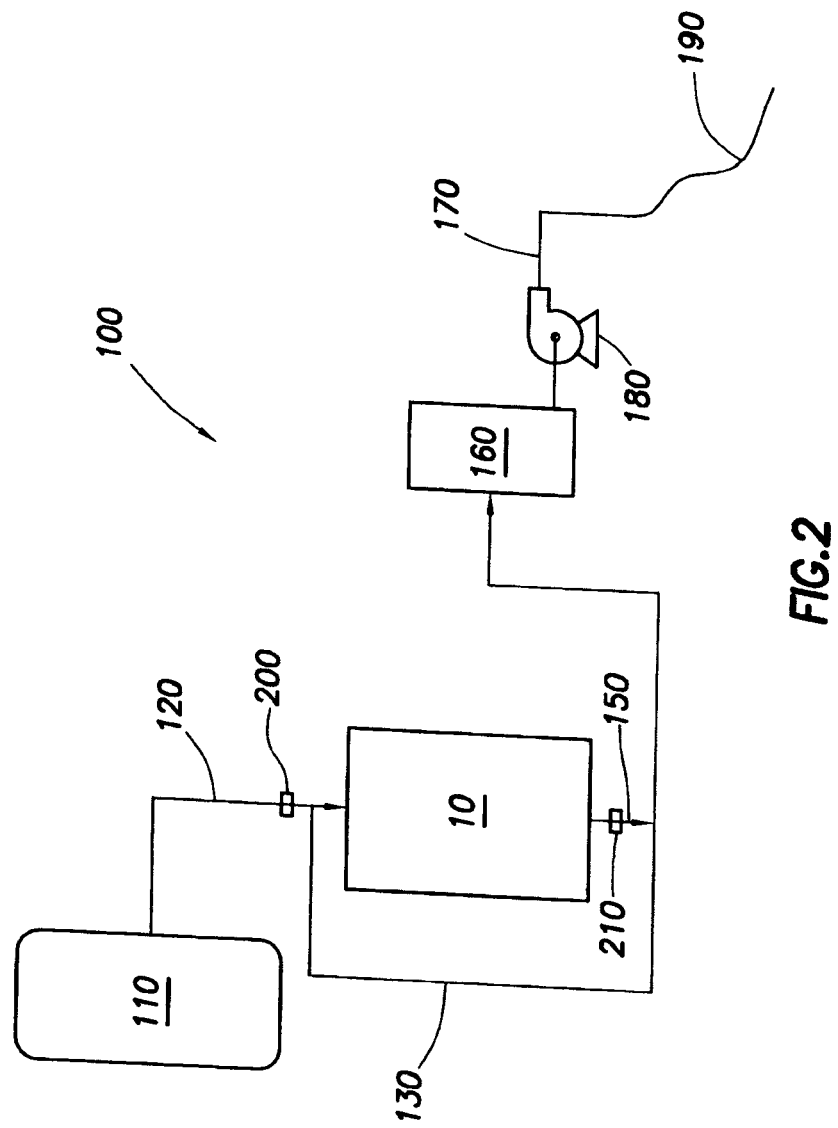
FIG. 2 is a block diagram of an injection system consistent with the present disclosure.

One embodiment of LDHI injection system 100 is shown in FIG. 2. LDHI is located on the drilling rig (not shown). LDHI storage tank 110 stores the LDHI for injection into umbilical 190. In the embodiment shown in FIG. 2, LDHI stored in LDHI storage tank 110 is discharged from LDHI storage tank 110 through LDHI storage tank discharge line 120. The water content of the LDHI in LDHI storage tank discharge line 120 is monitored by inlet water monitor 200. If the water content measured by inlet water monitor 200 is below a first predetermined threshold, the LDHI in LDHI storage tank discharge line is allowed to pass through bypass line 130. In certain embodiments, it has been found that as little as 0.9 volume % of water can resulting in a pitting attack downhole. In other embodiments, it has been found that at 0.6 volume % water, if a pitting attack begins, it may not subside once initiated. In still other embodiments, it has been found that at 0.5 volume % water, little or no evidence exists for pitting initiation.

If the water content measured by inlet water monitor 200 is above a first predetermined threshold, the LDHI is passed through dryer system 10. After drying in dryer system 10, the LDHI is discharged through dryer discharge line 150. The water content of the LDHI in dryer discharge line 150 is monitored by outlet water monitor 200. If the water content of dryer discharge line 150 is above a second predetermined threshold, an operator may be notified that dryer system 10 may not be functioning properly. The operator may then take action to change a filter or otherwise investigate the problem.

As shown in FIG. 2, bypass line 130 and dryer discharge line join and are fed to filter 160. The placement of filter 160 is not critical. In other embodiments (not shown), filter 160 may be omitted, it may be located in LDHI storage tank discharge line 120 or in filter discharge line 170. Filter 160, when present, acts to remove particles that might otherwise clog umbilical 190. The filtered LDHI leaves filter 160 through filter discharge line 170 and is pumped by pump 180 into umbilical 190.

It is desirable to locate dryer 10 as close to umbilical 190 in order to reduce any opportunities for water contamination of the LDHI prior to injection into umbilical 190. In certain embodiments, bypass 130, dryer discharge line 150, and filter discharge line 170 may be hoses and/or piping dedicated to LDHI use.

In another embodiment of the present invention, water is removed from the LDHI by means of an internal desiccant. In this embodiment, a chemical is added to the LDHI to bond with the water and reduce or prevent the bound water from reacting with the residual halides in the LDHI. Suitable internal desiccants are compatible with the LDHI and are typically not acidic.

Examples of suitable internal desiccants for use with quaternary amine type LDHIs include anhydrides represented by the following formula:

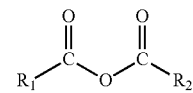

Wherein $R_1$ and $R_2$ may be the same or different and may include carbon chains of one to ten carbons in length, straight or branched, and/or contain heterocyclic, polycyclic, or substituted aromatic rings. Examples of such anhydrides include, but are not limited to, acetic anhydride, succinic anhydride, maleic anhydride, propionic anhydride, butanoic anhydride, ethaoic anhydride, benzoic anhydride, methanicpropane anhydride, phthalic anhydride, and mixtures thereof. Other suitable internal desiccants include metal oxides, including, but not limited to, barium oxides, sodium pentoxide, or phosphorus pentoxide.

The amount of internal desiccant used is dependent upon how hygroscopic the internal desiccant and how much water is expected to be present in the LDHI. In certain embodiments of the present invention, an excess of internal desiccant is used to address water absorption beyond the point where the internal desiccant is added. In addition, an excess of desiccant may limit heightened corrosion that may occur downhole with small amounts of water.

In certain embodiments of the present disclosure, the internal desiccant is added to the LDHI batchwise. In other embodiments, the internal desiccant is added continuously.

EXAMPLES

Examples are shown below.

Example 1

Figure 3:
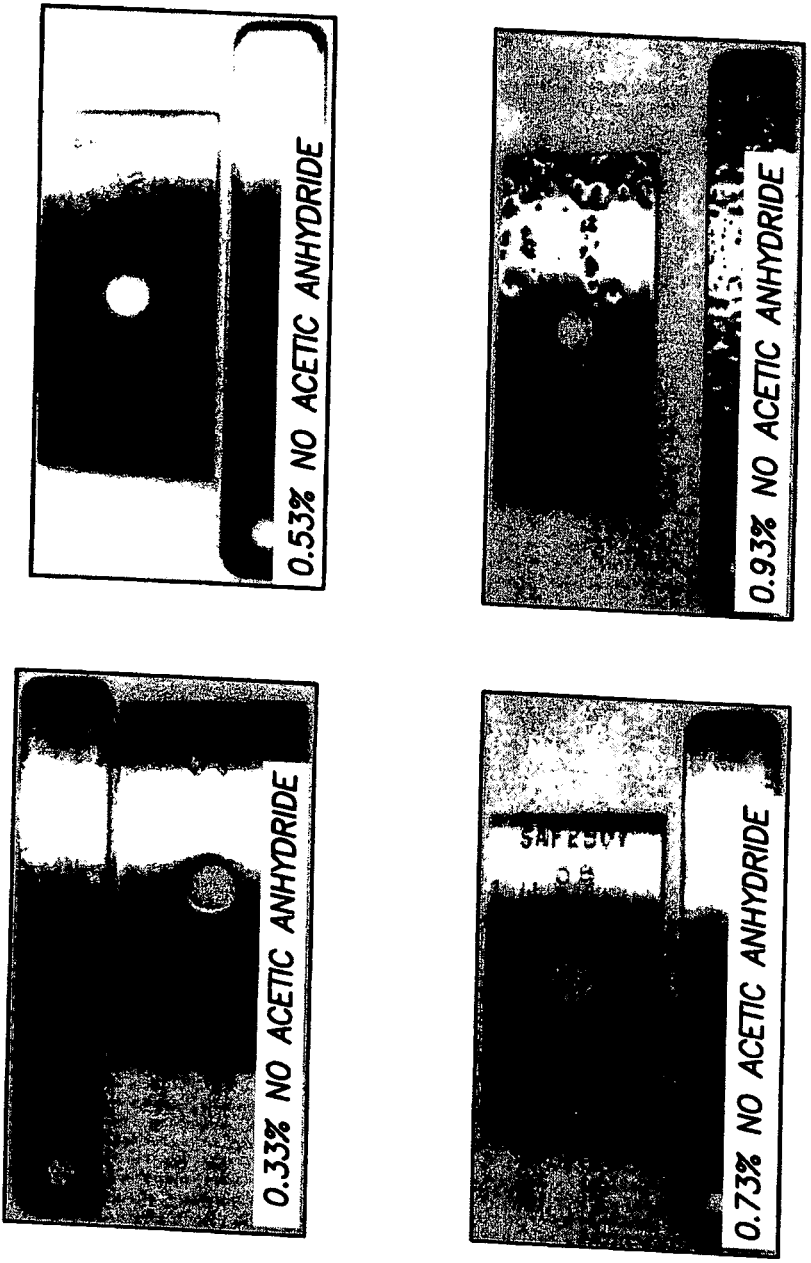
FIG. 3 is a photograph of the results of a coupon submersion test as reflected in Example 1.

Coupon submersion test with alloys 316L SS and Super Duplex 2507. Coupons were submerged in LDHI at various water cuts, without the presence of acetic anhydride, for 14 days at 100 F. As shown in FIG. 3, pitting attack was not observed on the coupons up to a water cut of 0.73%. Significant pitting attack was observed on both alloys at a water cut of 0.93%.

Example 2

Figure 4:
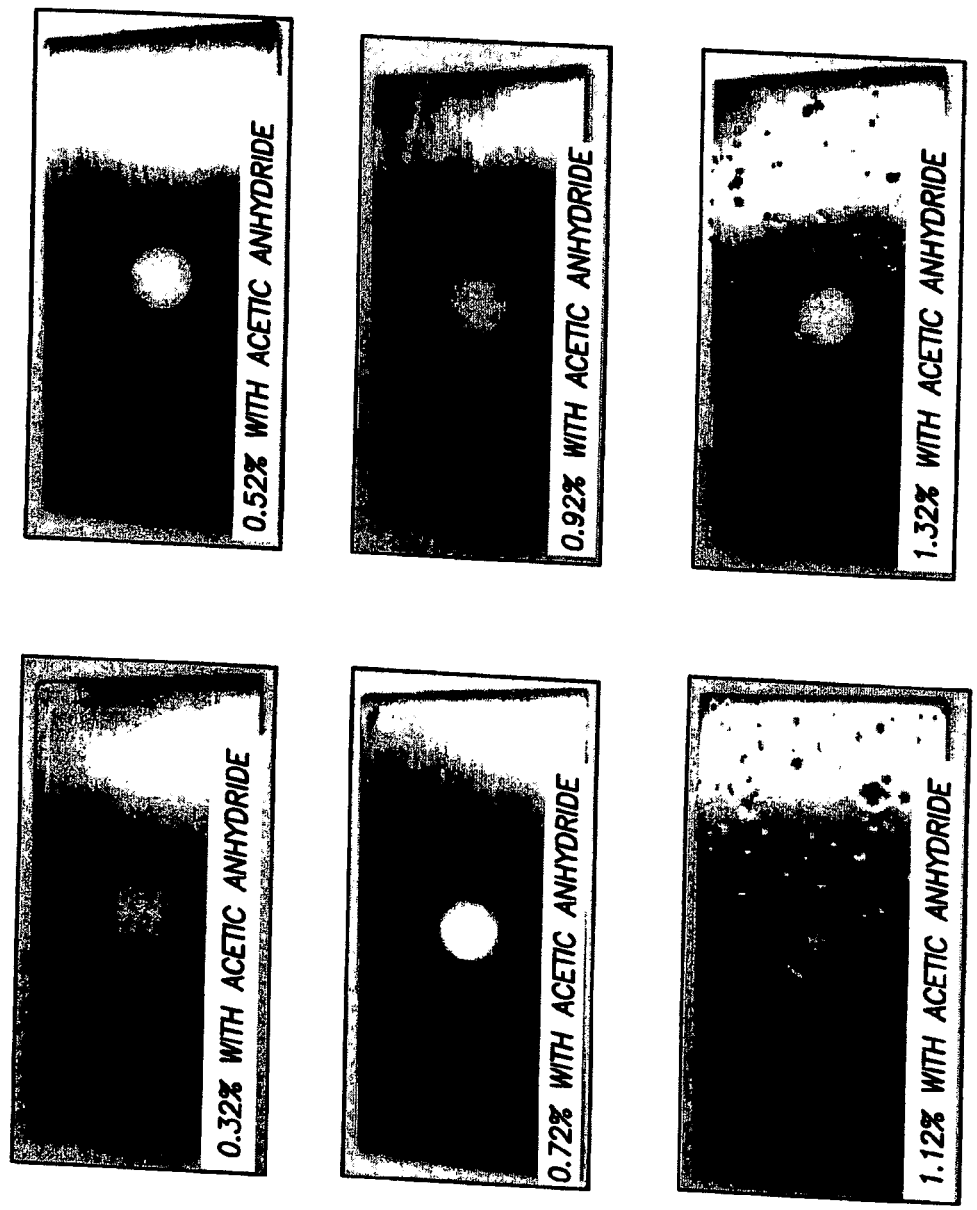
FIG. 4 is a photograph of the results of a coupon submersion test as reflected in Example 2.

Coupon submersion test with Super Duplex 2507. Coupons were submerged in LDHI at various water cuts, with 1% acetic anhydride (v/v), for 14 days at 100 F. As shown in FIG. 4, pitting attack was not observed on the coupons up to a water cut of 0.92%. Significant pitting attack was observed on both alloys at water cuts of 01.12 and 1.32%.

Example 3

Figure 5:
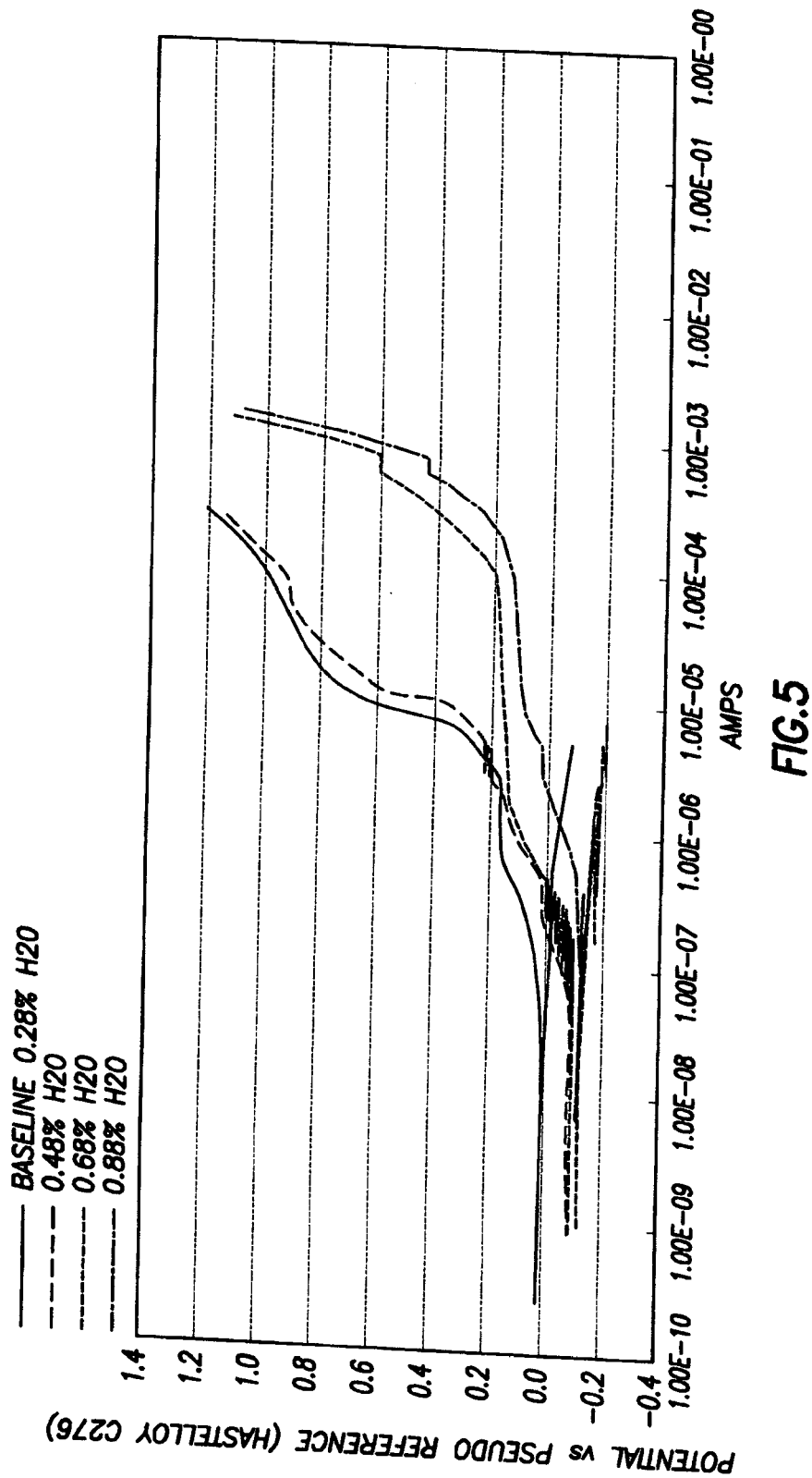
FIG. 5 is a graph of forward scans of cyclic potentiodynamic scans as reflected in Example 3.

Forward scans of cyclic potentiodynamic scans of 316L SS in an LDHI at various water cuts at 100 F. Each scan was started 100 mV below Ecorr, scanned in the anodic direction at 0.2 mV/sec, and reversed when a current density of 4 mA/cm$^2$ or a potential of 1.2 V versus was reached. As shown in FIG. 5, a significant jump in the total current occurs at water concentrations of 0.68% and higher. This observation reflects an increase in the corrosion current, due to localized film breakdown, as the alloy is polarized anodically from Ecorr.

Example 4

Figure 6:
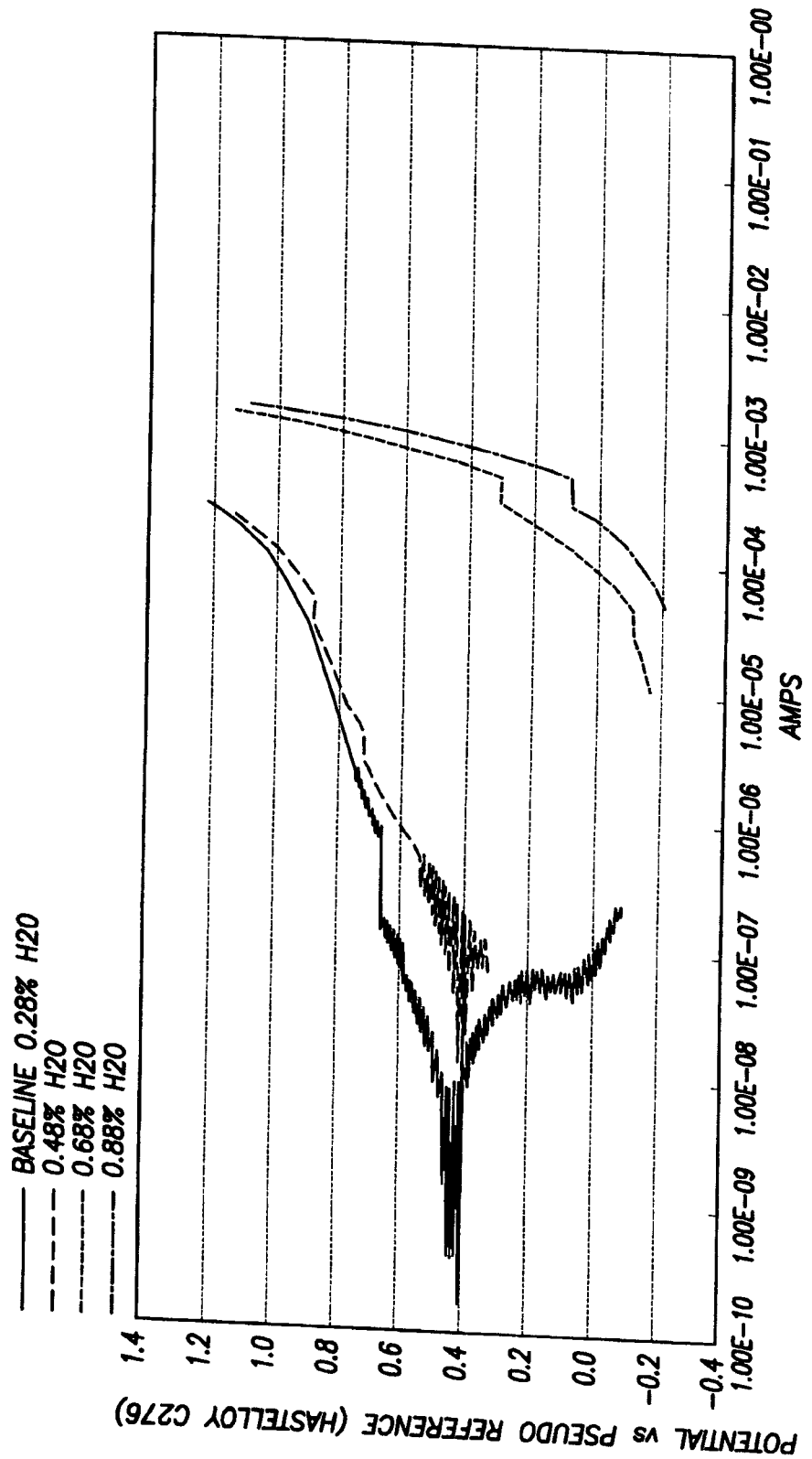
FIG. 6 is a graph of return scans of cyclic potentiodynamic scans as reflected in Example 4.

Return scans of cyclic potentiodynamic scans of 316L SS in a LDHI at various water cuts at 100 F. Each scan was started 100 mV below Ecorr, scanned in the anodic direction at 0.2 mV/sec, and reversed when a current density of 4 mA/cm$^2$ or a potential of 1.2 V versus was reached. These return scans are the "mates" to the forward scans shown in FIG. 5. As shown in FIG. 6, the positive hysteresis loop is observed at all potentials more noble than the Ecorr in the tests with water concentration of 0.68% or higher. This is an indication that the pitting attack that was initiated during the forward scans does not necessarily repassivate. The large hysteresis loop, in relation to Ecorr, suggest that there may be a very small potential region in which 316L SS remains unsusceptible to pitting attack at water concentrations of 0.68% and higher.

Example 5

Figure 7:
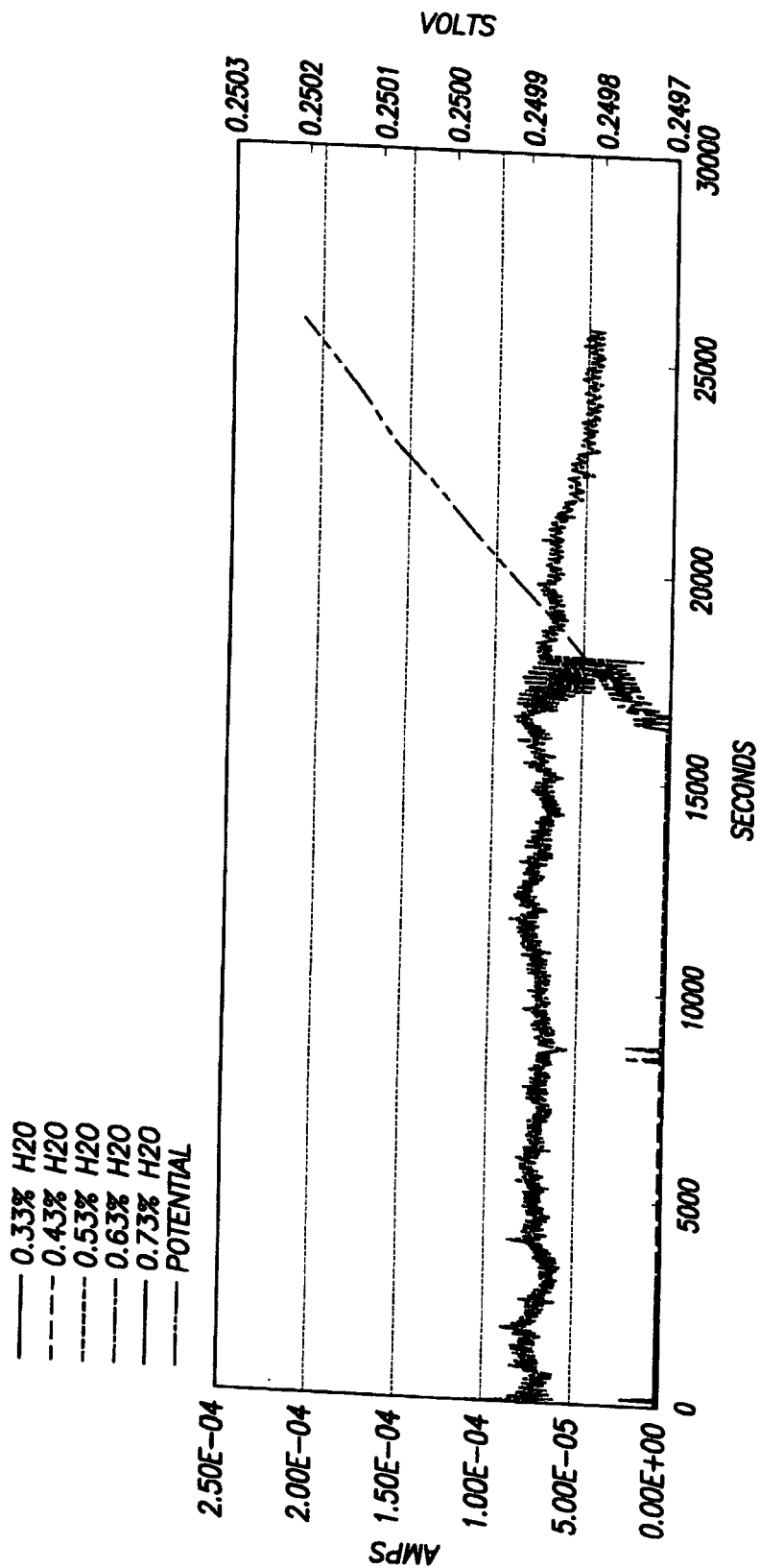
FIG. 7 is a graph of potentiostatic tests as reflected in Example 5.

Potentiostatic test with 316L SS in an LDHI at various water concentrations at 100 F. The electrode was held at a potential of 250 mV versus the reference electrode. This potential was chosen based on the cyclic potentiodynamic scans, as a significant increase in the corrosion current is expected once pitting attack is initiated. As shown in FIG. 7, a definitive increase in the corrosion current is observed at a water concentration of 0.73%. This correlates very well with the cyclic potentiodynamic scans which showed a significant increase at a water concentration of 0.68%.

What is claimed is:

1. A method for controlling corrosion in an umbilical comprising:
   providing an first instance low dose hydrate inhibitor (LDHI) stream, the LDHI stream containing water;
   determining a first maximum allowable water content of the LDHI stream;
   determining that water content in the LDHI stream exceeds the first maximum allowable water content;
   drying the LDHI stream based upon the water content in the LDHI stream exceeding the first maximum allowable water content, so as to form a dried LDHI stream; and
   injecting the dried LDHI stream into the umbilical.

2. The method of claim 1 further comprising:
   filtering the LDHI stream or the dried LDHI stream before injecting the LDHI stream or the dried LDHI stream into the umbilical.

3. The method of claim 1 further comprising before the injecting step but after the drying step:
   monitoring the water content in the dried LDHI stream.

4. The method of claim 1, further comprising:
   determining a second maximum allowable water content of the LDHI stream; and
   after drying the LDHI stream but before injecting the dried LDHI stream, determining that the water content in the dried LDHI stream exceeds the second maximum allowable water content.

5. The method of claim 4, wherein the second maximum allowable water content is 0.5 volume % water.

6. The method of claim 1 wherein the step of drying the LDHI stream is performed by contacting the LDHI stream with an external desiccant.

7. The method of claim 6, wherein the external desiccant comprises a desiccant selected from the group consisting of: clay, silica gel, a molecular sieve, calcium oxide, calcium sulfate, activated charcoal, calcium chloride, a metal salt, activated alumina, aerogel, benzophenone, calcium hydride, cobalt(II) chloride, copper(II) sulfate, lithium chloride, lithium hydride, lithium bromide, magnesium, magnesium sulfate, magnesium perchlorate, a sodium-potassium alloy, phosphorus pentoxide, potassium, potassium carbonate, sodium, sodium chlorate, sodium chloride, sodium hydroxide, sodium sulfate, sodium-benzophenone, sucrose, sulfuric acid, and any combination thereof.

8. The method of claim 7, wherein the clay is a Montmorillonite clay.

9. The method of claim 7, wherein the molecular sieve is a synthetic zeolite.

10. The method of claim 1, wherein the first maximum allowable water content is 0.9 volume % water.

* * * * *